United States Patent
Volftsun et al.

(10) Patent No.: US 11,124,406 B1
(45) Date of Patent: Sep. 21, 2021

(54) SYSTEM AND METHOD FOR PISTON DETECTION IN A METERING MECHANISM FOR USE WITH BEVERAGE DISPENSING SYSTEM

(71) Applicant: Sestra Systems, Inc.

(72) Inventors: Lev Volftsun, Sterling, VA (US); Alex Belfor, Sterling, VA (US); Anatoly Boshkin, Sterling, VA (US)

(73) Assignee: SESTRA SYSTEMS, INC., Sterling, VA (US)

(*) Notice: Subject to any disclaimer, the term of this patent is extended or adjusted under 35 U.S.C. 154(b) by 0 days.

(21) Appl. No.: 17/120,133

(22) Filed: Dec. 12, 2020

Related U.S. Application Data

(63) Continuation-in-part of application No. 16/744,263, filed on Jan. 16, 2020, and a continuation-in-part of application No. 15/487,488, filed on Apr. 14, 2017, now Pat. No. 9,926,181, which is a continuation-in-part of application No. 15/424,478, filed on Feb. 3, 2017, now Pat. No. 10,167,183, and a continuation-in-part of application No. 15/332,117, filed on Oct. 24, 2016, now Pat. No. 10,294,092, and a continuation-in-part of application No. 14/686,820, filed on Apr. 15, 2015, now Pat. No. 10,125,002.

(60) Provisional application No. 62/949,141, filed on Dec. 17, 2019, provisional application No. 62/794,009, filed on Jan. 18, 2019, provisional application No. 62/023,899, filed on Jul. 13, 2014.

(51) Int. Cl.
*B67D 1/08* (2006.01)
*B67D 1/00* (2006.01)
*B67D 1/12* (2006.01)

(52) U.S. Cl.
CPC ......... *B67D 1/0888* (2013.01); *B67D 1/0037* (2013.01); *B67D 1/1234* (2013.01)

(58) Field of Classification Search
CPC ... B67D 1/0888; B67D 1/0037; B67D 1/1234
USPC .......................................................... 222/52
See application file for complete search history.

(56) References Cited

U.S. PATENT DOCUMENTS

| | | | | |
|---|---|---|---|---|
| 928,588 A | * | 7/1909 | Cornish | B67D 1/0084 222/144.5 |
| 3,216,627 A | * | 11/1965 | Best | B67D 1/12 222/249 |

(Continued)

OTHER PUBLICATIONS https://cellarcraftuk.com/15-reasons-clean-beer-lines.

*Primary Examiner* — Paul R Durand
*Assistant Examiner* — Michael J. Melaragno
(74) *Attorney, Agent, or Firm* — Gugliotta & Gugliotta, LPA

(57) ABSTRACT

A dispensing and pour control system for a regulated beverage having a metering system that provides a discharge in a controlled and metered manner. A sensor system uses a Line Control Board (LCB) that detects a piston location inside a metering conduit. A plurality of magnetic sensors is positioned at equal intervals and in the same plane collinear with the movement of a magnetic piston within the metering mechanism conduit. The piston position is detected by obtaining a set of momentary readings of the magnetic sensors and estimating a location of the piston by interpolation of the piston position as an anticipate location between sensors that are adjacent and showing readings of opposing signs.

19 Claims, 6 Drawing Sheets

(56) References Cited

U.S. PATENT DOCUMENTS

| | | | | |
|---|---|---|---|---|
| 3,221,936 A * | 12/1965 | Spinuzza | B67D 1/0888 | 222/54 |
| 3,305,136 A * | 2/1967 | Harris | B67D 1/12 | 222/129.1 |
| 3,370,759 A * | 2/1968 | Johansson | B67D 1/104 | 222/249 |
| 3,380,629 A * | 4/1968 | Kontra | B67D 1/1466 | 222/26 |
| 3,524,383 A * | 8/1970 | Locke | F15B 21/02 | 91/35 |
| 3,552,606 A * | 1/1971 | Kraft | G01F 11/04 | 222/249 |
| 3,565,287 A * | 2/1971 | Johnston | G01F 11/04 | 222/26 |
| 3,580,425 A * | 5/1971 | DeMan | B67D 1/0021 | 222/129.1 |
| 3,677,173 A * | 7/1972 | Fogle, Jr. | A47B 31/02 | 99/357 |
| 3,712,514 A * | 1/1973 | LeBlanc | F25D 31/006 | 222/146.6 |
| 3,718,233 A * | 2/1973 | Nordhoff | B67D 1/1234 | 222/641 |
| 3,790,032 A * | 2/1974 | George | F25D 3/08 | 222/146.1 |
| 3,831,821 A * | 8/1974 | Doyen | B65B 3/32 | 222/255 |
| 3,870,089 A * | 3/1975 | Laub, III | B67C 3/206 | 141/44 |
| 3,933,275 A * | 1/1976 | Metzner | B67D 3/0009 | 222/131 |
| 3,940,019 A * | 2/1976 | Kross | B67D 1/0041 | 222/30 |
| 3,949,902 A * | 4/1976 | Thompson | A47J 31/46 | 222/129.1 |
| 4,004,715 A * | 1/1977 | Williams | B67D 1/1234 | 222/30 |
| 4,224,959 A * | 9/1980 | Fling | F16K 31/44 | 137/315.37 |
| 4,225,059 A * | 9/1980 | Kappos | B67D 1/04 | 222/146.6 |
| 4,226,343 A * | 10/1980 | Fling | B67D 1/12 | 222/504 |
| 4,386,716 A * | 6/1983 | Buck | G05D 11/001 | 222/134 |
| 4,491,248 A * | 1/1985 | Blackwell | G01F 11/04 | 222/249 |
| 4,518,104 A * | 5/1985 | Iannelli | B67D 1/0861 | 137/334 |
| 4,655,374 A * | 4/1987 | Guerette | B67D 1/1466 | 222/504 |
| 4,736,873 A * | 4/1988 | Patriquin | B67D 1/104 | 137/625.6 |
| 4,886,190 A * | 12/1989 | Kirschner | B67D 1/1256 | 222/57 |
| 4,927,567 A * | 5/1990 | Rudick | B01F 3/04269 | 261/104 |
| 4,966,306 A * | 10/1990 | Credle, Jr. | B67D 1/0085 | 222/1 |
| 4,979,641 A * | 12/1990 | Turner | B67D 1/0855 | 222/153.03 |
| 5,007,560 A * | 4/1991 | Sassak | B67D 1/04 | 222/1 |
| 5,016,786 A * | 5/1991 | Horino | B67D 1/1252 | 222/504 |
| 5,022,557 A * | 6/1991 | Turner | B67D 1/0855 | 222/54 |
| 5,044,528 A * | 9/1991 | Becker | B67D 1/1405 | 222/504 |
| 5,121,855 A * | 6/1992 | Credle, Jr. | B67D 1/0044 | 137/99 |
| 5,291,004 A * | 3/1994 | Frank | B67D 1/0867 | 222/2 |
| 5,360,140 A * | 11/1994 | Senghaas | B67D 1/0041 | 222/129.1 |
| 5,363,989 A * | 11/1994 | Zeamer | B67D 1/1213 | 137/382 |
| 5,381,926 A * | 1/1995 | Credle, Jr. | B67D 1/122 | 222/1 |
| 5,390,834 A * | 2/1995 | Bitter | A47B 31/02 | 222/608 |
| 5,431,302 A * | 7/1995 | Tulley | B67D 1/1213 | 222/14 |
| 5,454,406 A * | 10/1995 | Rejret | B67D 1/1213 | 137/624.12 |
| 5,564,602 A * | 10/1996 | Cleland | F25D 17/02 | 222/146.6 |
| 5,730,323 A * | 3/1998 | Osborne | B67D 1/04 | 222/129.1 |
| 5,750,905 A * | 5/1998 | Weimer | B67D 1/08 | 222/14 |
| 5,829,633 A * | 11/1998 | Emmerich | G01F 11/16 | 222/1 |
| 5,839,483 A * | 11/1998 | Rejret | B67D 1/1466 | 141/1 |
| 5,845,824 A * | 12/1998 | Weimer | B67D 1/1236 | 222/641 |
| 5,915,602 A * | 6/1999 | Nelson | B67D 1/06 | 222/608 |
| 5,988,859 A * | 11/1999 | Kirk | B67D 1/06 | 222/30 |
| 6,149,032 A * | 11/2000 | Seitz | B67D 7/18 | 222/23 |
| 6,230,761 B1 * | 5/2001 | Richard | B65B 3/04 | 141/104 |
| 6,296,153 B1 * | 10/2001 | Bilskie | B67D 1/103 | 222/129.2 |
| 6,327,869 B1 * | 12/2001 | Shapiro | F16K 11/07 | 141/114 |
| 6,354,341 B1 * | 3/2002 | Saveliev | B67D 1/0006 | 141/104 |
| 6,354,342 B1 * | 3/2002 | Gagliano | B67D 1/0006 | 141/82 |
| 6,360,556 B1 * | 3/2002 | Gagliano | B67D 1/0006 | 222/146.6 |
| 6,398,084 B2 * | 6/2002 | Maruyama | B67D 1/14 | 222/504 |
| 6,449,970 B1 * | 9/2002 | Gagliano | B67D 1/0006 | 62/196.4 |
| 6,609,391 B2 * | 8/2003 | Davis | B67D 1/0012 | 222/146.6 |
| 6,681,594 B1 * | 1/2004 | Nelson | B67D 1/0864 | 62/389 |
| 6,715,641 B2 * | 4/2004 | Torimitsu | B67D 1/1405 | 222/400.7 |
| 7,086,566 B2 * | 8/2006 | Goepfert | B67D 1/06 | 222/64 |
| 7,753,231 B2 * | 7/2010 | Giles | B67D 1/0888 | 222/14 |
| 9,809,238 B2 * | 11/2017 | Kincaid | B65D 77/0493 | |
| 9,926,181 B1 * | 3/2018 | Volftsun | B67D 1/1256 | |
| 10,167,183 B1 * | 1/2019 | Volftsun | B67D 1/12 | |
| 10,294,093 B1 * | 5/2019 | Volftsun | B67D 1/0881 | |
| 10,813,372 B2 * | 10/2020 | Cocchi | A23G 9/08 | |
| 2001/0000107 A1 * | 4/2001 | Simmons | B67D 1/0864 | 222/129.1 |
| 2004/0226960 A1 * | 11/2004 | Aguirre | B67D 1/0406 | 222/1 |
| 2006/0113322 A1 * | 6/2006 | Maser | B67D 1/07 | 222/129.1 |
| 2006/0162370 A1 * | 7/2006 | Haskayne | B67D 1/1405 | 62/390 |
| 2007/0095859 A1 * | 5/2007 | Maser | B67D 1/1243 | 222/148 |
| 2008/0189078 A1 * | 8/2008 | Vok | B67D 1/0842 | 702/188 |
| 2008/0202148 A1 * | 8/2008 | Gagliano | B67D 1/1405 | 62/392 |

(56) References Cited

U.S. PATENT DOCUMENTS

| | | | | |
|---|---|---|---|---|
| 2009/0194562 A1* | 8/2009 | Kessler | ............. | E03D 9/03 222/1 |
| 2010/0089943 A1* | 4/2010 | Till | ............. | B67D 3/0006 222/1 |
| 2010/0237100 A1* | 9/2010 | Broussard | ............. | B67D 1/0857 222/146.6 |
| 2010/0326123 A1* | 12/2010 | Johnson | ............. | F25D 31/006 62/457.9 |
| 2011/0017776 A1* | 1/2011 | Metropulos | ............. | B67D 1/0888 222/129.1 |
| 2011/0108240 A1* | 5/2011 | Bax | ............. | B67D 1/0868 165/104.19 |
| 2011/0253746 A1* | 10/2011 | O'Keefe, Jr. | ............. | B67D 1/0005 222/132 |
| 2011/0298583 A1* | 12/2011 | Libby | ............. | B67D 1/0041 340/5.28 |
| 2013/0153684 A1* | 6/2013 | Taranta | ............. | B05B 12/008 239/337 |
| 2013/0205881 A1* | 8/2013 | Naether | ............. | B60T 11/16 73/121 |
| 2014/0039396 A1* | 2/2014 | Geipel | ............. | A61M 5/14216 604/152 |
| 2014/0144935 A1* | 5/2014 | O'Keefe, Jr. | ............. | B67D 1/0004 222/23 |
| 2014/0151402 A1* | 6/2014 | Jannatkhah | ............. | B67D 1/0858 222/108 |
| 2014/0209634 A1* | 7/2014 | Metropulos | ............. | B67D 1/06 222/129.1 |
| 2014/0372233 A1* | 12/2014 | Knecht | ............. | G06Q 30/0635 705/15 |
| 2015/0027665 A1* | 1/2015 | Cooke | ............. | F28F 27/02 165/96 |
| 2015/0354886 A1* | 12/2015 | Sinko | ............. | F25D 31/006 62/390 |
| 2016/0130070 A1* | 5/2016 | Orr | ............. | B65D 77/06 222/95 |
| 2016/0236926 A1* | 8/2016 | Leyva | ............. | B67D 1/04 |
| 2016/0257549 A1* | 9/2016 | Volftsun | ............. | B67D 7/08 |
| 2016/0355389 A1* | 12/2016 | Bursey | ............. | B67D 1/0884 |
| 2016/0377067 A1* | 12/2016 | Saveliev | ............. | B67D 1/0027 222/1 |
| 2017/0029752 A1* | 2/2017 | Mitchell | ............. | C12C 11/003 |
| 2017/0101301 A1* | 4/2017 | Volin | ............. | F25D 3/06 |
| 2017/0107982 A1* | 4/2017 | Cedrone | ............. | F04B 9/02 |
| 2017/0360243 A1* | 12/2017 | Crowne | ............. | A47J 31/41 |
| 2018/0038898 A1* | 2/2018 | Shimizu | ............. | G01R 33/09 |
| 2018/0111173 A1* | 4/2018 | Bertness | ............. | B08B 9/0325 |
| 2018/0185836 A1* | 7/2018 | Romer | ............. | B01L 3/0237 |
| 2019/0031484 A1* | 1/2019 | Allgood | ............. | B67D 1/0842 |
| 2019/0047839 A1* | 2/2019 | Giarratano | ............. | B67D 1/0857 |
| 2019/0062140 A1* | 2/2019 | Yang | ............. | B67D 1/0867 |
| 2019/0358626 A1* | 11/2019 | Romer | ............. | B01L 3/0268 |
| 2020/0051148 A1* | 2/2020 | Green | ............. | G06K 9/00885 |
| 2020/0055720 A1* | 2/2020 | Volftsun | ............. | B67D 1/0878 |
| 2020/0076275 A1* | 3/2020 | Ettinger | ............. | G01R 33/072 |
| 2020/0095108 A1* | 3/2020 | Cook | ............. | B67D 1/1284 |
| 2020/0131016 A1* | 4/2020 | Mitchell | ............. | G01F 11/021 |
| 2020/0166396 A1* | 5/2020 | Volftsun | ............. | G01F 11/029 |
| 2021/0047169 A1* | 2/2021 | Volftsun | ............. | B67D 1/0406 |
| 2021/0087041 A1* | 3/2021 | Volftsun | ............. | B67D 1/0888 |
| 2021/0154659 A1* | 5/2021 | Romer | ............. | B01L 3/0237 |

\* cited by examiner

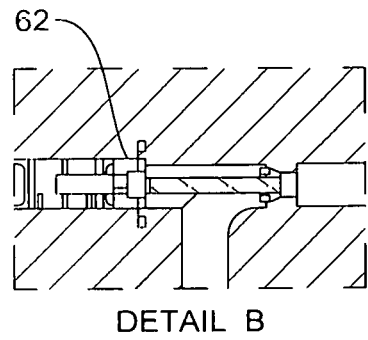
DETAIL B
FIG. 6
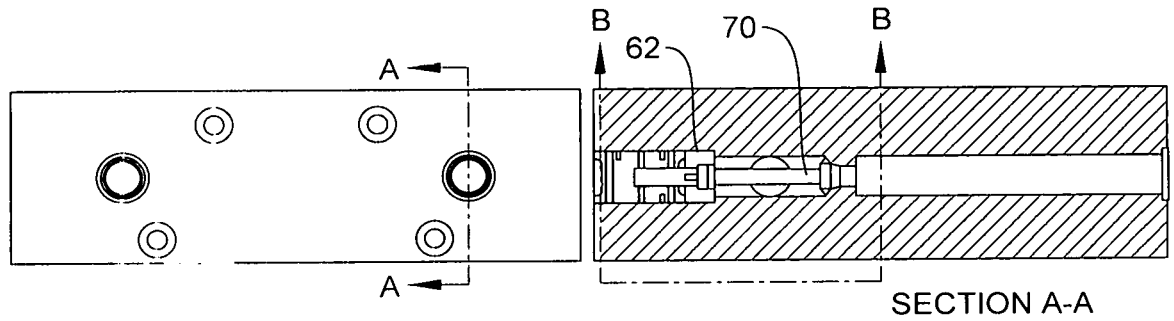
FIG. 7
FIG. 8
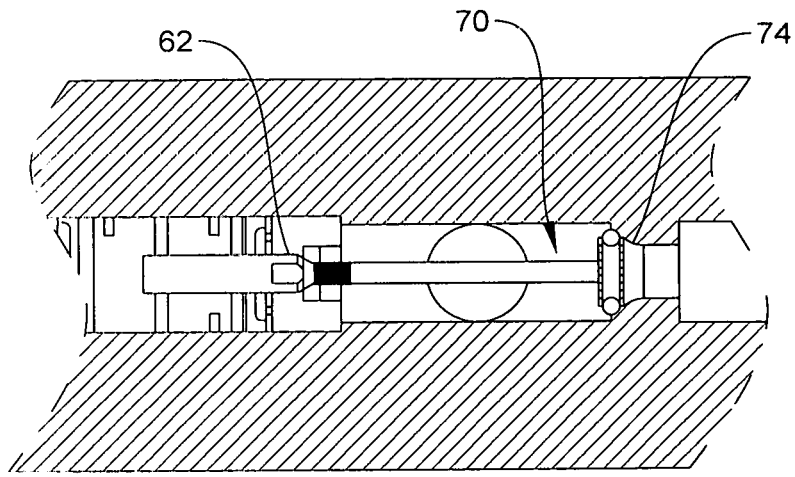
DETAIL B
SCALE 4 : 1
FIG. 9

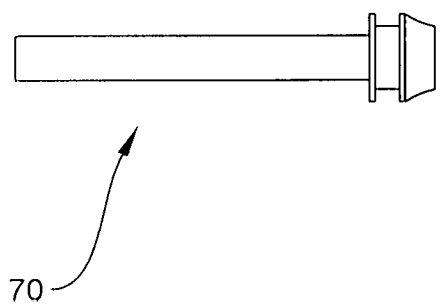 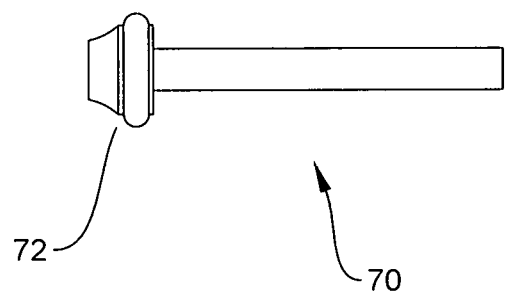
FIG. 10A                                   FIG. 10B

SYSTEM AND METHOD FOR PISTON DETECTION IN A METERING MECHANISM FOR USE WITH BEVERAGE DISPENSING SYSTEM

BACKGROUND OF THE INVENTION

1. Field of the Invention

The present invention relates generally to a system and method for the automated metering, dispensing, reporting and tracking of dispensing beverages and, more particularly, to an improved metering mechanism including anticipatory control adapted for use therewith.

2. Description of the Related Art

In the automated beverage dispensing systems of the Related Art, bulk alcoholic beverages such as beer, wine or cocktails have been successfully dispensed in a manner that meters, tracks, controls and continuous dispenses in a faster and more accurate manner. Such systems prevent oxidation of the beverage contents while allowing for necessary and routine delivery line cleaning through several mechanism.

A need exists for improvements in the operation, repeatability and accuracy in the metering mechanism for use with such beverage dispensing systems.

SUMMARY OF THE INVENTION

It is thus an object of the present invention to provide for more efficient, optimized fluid flow path metering mechanism for use with beverage dispensing systems.

It is a feature of the present invention to provide such a metering mechanism formed in a manifold style assembly.

The present application provides a dispensing and pour control system for a regulated beverage having a metering system that provides a discharge in a controlled and metered manner. A sensor system uses a Line Control Board (LCB) that detects a piston location inside a metering conduit. A plurality of magnetic sensors are positioned at equal intervals and in the same plane collinear with the movement of a magnetic piston within the metering mechanism conduit. The piston position is detected by obtaining a set of momentary readings of the magnetic sensors and estimating the exact location of the piston by interpolating the distance between the sensors that are adjacent and showing readings of opposing signs.

The anticipated piston location is estimated by processing the set of all sensor readings reported at a given moment in time. The exact piston location algorithm consists of two steps:
  a. determining the two sensors that show the maximum and minimum readings over the entire set; and
  b. performing a linear interpolation based on two readings of opposite sign to find the point when the curve crosses 0 between two points.

If the "0-point" is close to one of the two sensors a smoothing function is applied that is constructed based on actual data observed for a given hardware setup An advantage of the present invention to provide a beverage dispensing system metering mechanism improves accuracy and repeatability of the metering function by anticipating the movement of the metering piston using a hardware setup that places multiple identical magnetic (Hall Effects) sensors at equal intervals and same plane, alongside the cylinder with a moving piston containing a magnet. In such a configuration, at equal time intervals readings on all sensors are fed into a function that estimates the magnet's (and therefore piston's) location, relatively to the center of the cylinder.

Further objects, features and advantages of the invention will become apparent in the course of the following description.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

FIG. 6 is a cross sectional detail view taken along line B-B of FIG. 5;

FIG. 7 is a right side elevational schematic of the manifold 10;

FIG. 8 is a cross sectional view taken along line A-A of FIG. 7;

FIG. 9 is a cross sectional detail view taken along line B-B of FIG. 8;

FIG. 10a is a detail top plan view of a poppet spool actuator piston 70 for use therewith;

FIG. 10b is a detailed dimensional plan view thereof;

DESCRIPTION OF THE PREFERRED EMBODIMENTS

Figure 1:
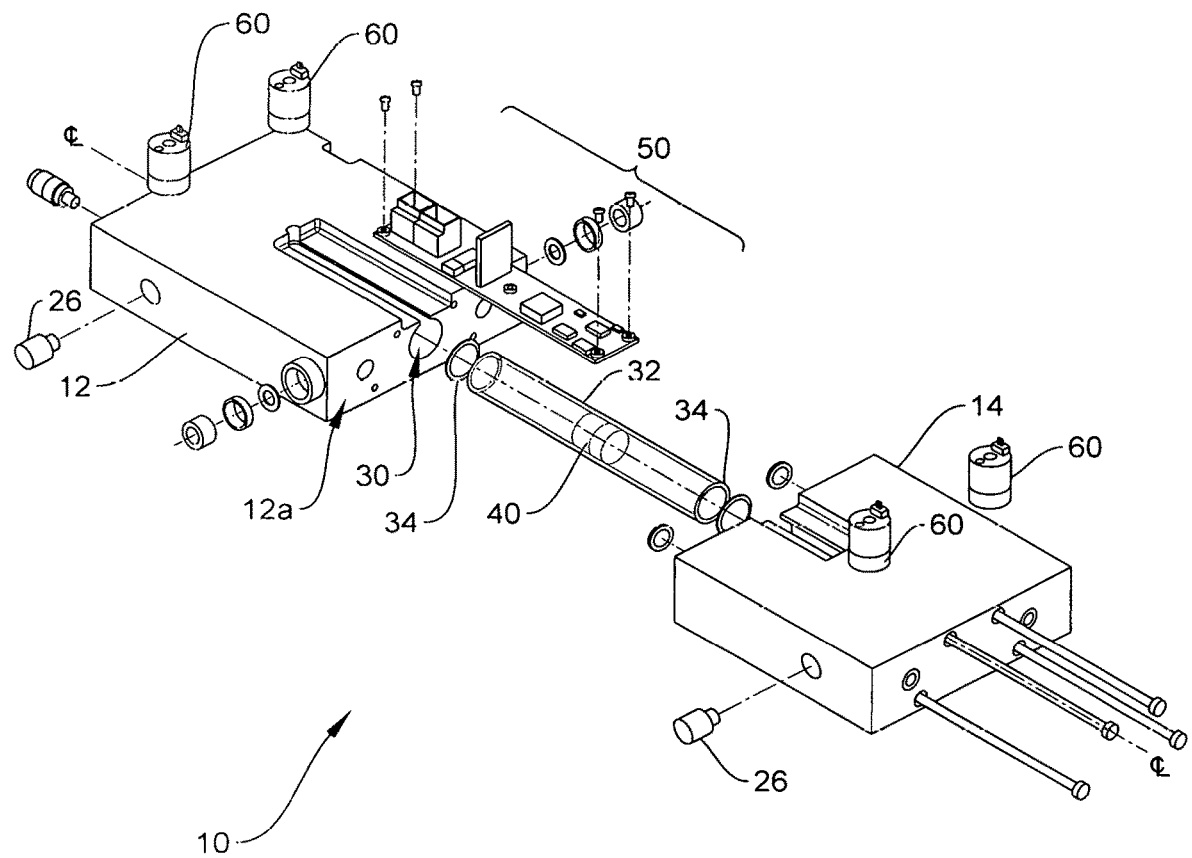
FIG. 1 is an exploded right front perspective view of a metering mechanism according to an exemplary preferred embodiment of the present invention for use with a carbonated beverage dispensing system.
Figure 2:
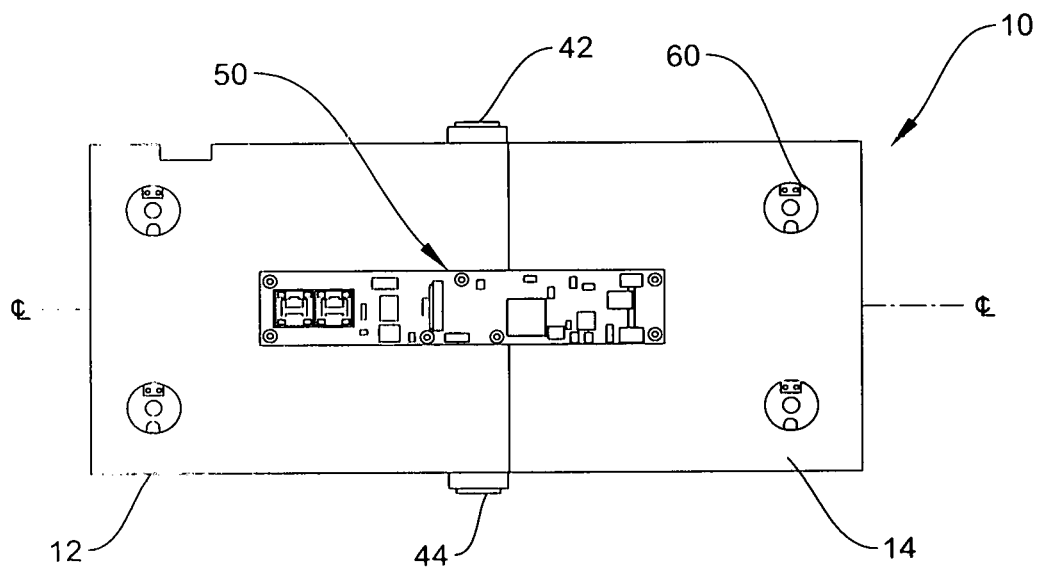
FIG. 2 is a top plan view thereof.
Figure 3:
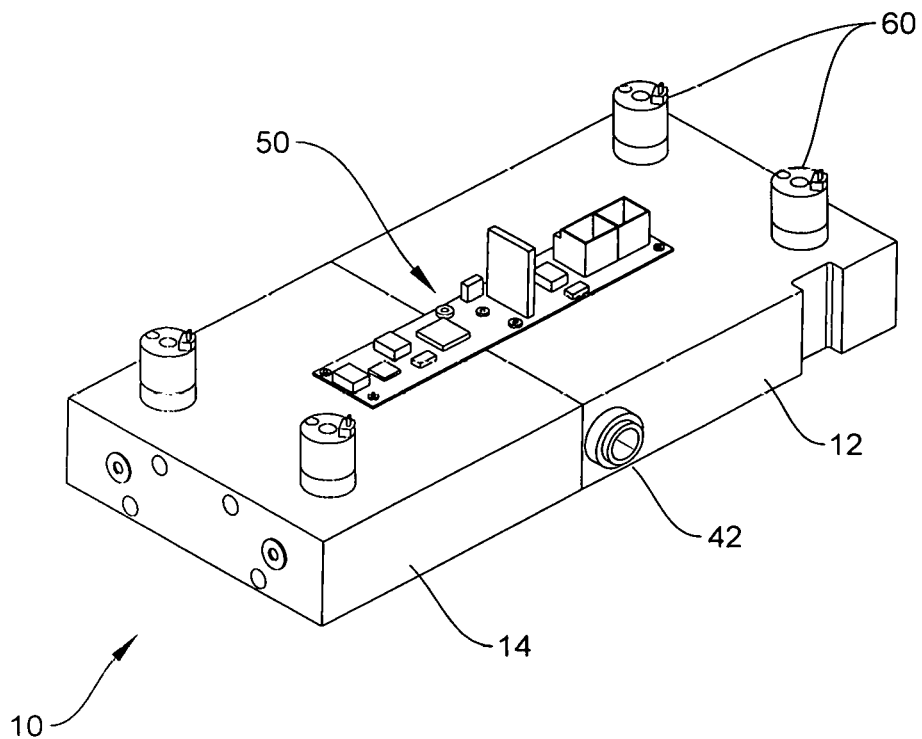
FIG. 3 is left front perspective view thereof.

The best mode for carrying out the invention is presented in terms of its preferred embodiment, herein depicted within the Figures.

1. Detailed Description of the Figures

Before explaining the present invention in detail, it is important to understand that the invention is not limited in its application to the details of the construction illustrated and the steps described herein. The invention is capable of other embodiments and of being practiced or carried out in a variety of ways. It is to be understood that the phraseology and terminology employed herein is for the purpose of description and not of limitation. It should be further apparent to a person having ordinary skill in the relevant art, in light of the present teachings, that the discussed enablement being described for use with bulk wine should be considered equivalent for use with any other beverages.

For purposes of the present disclosure the terms "a" and "an" herein do not denote a limitation of quantity, but rather denote the presence of at least one (1) of the referenced items. Further for purposes of the present disclosure the terms "in", "out", "left" "right", "up" or "down" are all spatial and functionally relative directions used to aid in the description to best explain the principles of the invention and its practical application, and to aid others skilled in the art to best utilize the invention and are not meant to be limiting to any particular orientation.

Referring now in conjunction with FIG. 1-6, a metering mechanism, generally noted as 10, is shown according to an exemplary preferred embodiment of the present invention for use with a carbonated beverage dispensing system. The metering mechanism 10 includes a first manifold block 12 and a second manifold block 14. Each manifold block 12, 14 is formed as a generally rectangular cuboid element that each matingly interface with each other at an inner mating surface 12a, 14a, respectively. Each rectangular cuboid element 12, 14 is affixed collinearly along a lateral centerline "c/L" such as to form the metering mechanism 10 as a minimized volume manifold block. The manifold metering mechanism thereby further forms essentially: a fluid conduit system; a sensor control system 50; and a valve and actuator system.

The fluid conduit system is formed within each manifold block 12, 14 as series of linear, interacting fluid channels including an upper fluid conduit 16 opposite a lower fluid conduit 18 and a left fluid conduit 20 opposite a right fluid conduit 22. The upper and lower fluid conduits 16, 18 are formed as through drilled conduit spanning through each manifold block 12, 14. While 'drilling' in the conventional sense may be used as the method of machining, such a term should be used without limitation to any machining operation and should broadly include any other milling, machining or other process capable of obtaining a functionally broadly equivalent result. The left and right fluid conduits 20, 22 may thereby be formed, one within each manifold block 12, 14 respectively so as to form a continuous hydraulic circuit within the metering mechanism. Each left or right conduit 20, 22 merely needs to connect the upper and lower fluid channels 16, 18 and may be similarly formed by drilling or the equivalent from one side of the respective manifold block 12, 14 with the access orifice closed via a work port plug 26.

A central linear conduit 30 may be formed in a similar manner spanning through each manifold block 12, 14 to hydraulically connect the left and right fluid conduits 20, 22 and forming a third channel parallel to and between the upper charnel 16 and lower channel 18. A stainless-steel cylinder 32 may be formed and positioned as a continuous sleeve liner within the central linear conduit 30. The cylindrical sleeve 32 may be sealed about each open end with an "O"-ring seal 34 to form a hydraulically sealed system when assembled. Similar resilient seals may further be sealed between aligning and connecting fluid channels throughout the system 10.

An inlet port 42 and an outlet port 44 are oppositely formed to provide access to or egress within the fluid channels within the manifold 10. The inlet 42 and outlet 44 are operatively coupled to communicate with a beverage supply (not shown) in further operative connection with the bulk storage and distribution system for carbonated beverages such as, preferably, beer (also not shown). The magnetic piston 40 within the cylinder 32 forms one operative portion of a metering mechanism for providing a metered discharge of beer or beverage between the bulk storage and a tap or spigot in a manner that provides for a beverage specific controlled metered pour into a beverage container. Such a beverage metering, pouring, controlling, and monitoring/reporting system may be of the type described by, anticipated within or equivalent to those described in the above referenced Related Art, all of which are incorporated by reference as if fully rewritten herein. In a preferred embodiment the cylinder of the present invention is shown in greater detail. The metering cylinder 32 and piston 40 combination function as a line pressure powered bi-directional dispenser by redirecting the pressure from one end of the chamber to the other end. Such a chamber 32 allows for accurate, repeatable metering, utilizing, and preserving line pressure without the inclusion of an additional pumping device.

The sensor control system 50 is in operative interaction with the piston 40 for providing piston location sensor data input to an electronic control system in connection with the bulk storage and distribution system. The metering mechanism 10 provides for a metered discharge in fluid communication with the tap or spigot in a manner that provides for a beverage specific controlled metered pour into a beverage container, as best described in the Related Art. Measurement of a location of the piston 40 within the cylinder allows for accurate, repeatable metering, utilizing and preserving line pressure without the inclusion of an additional pumping device. The sensor system 50 may be provided as (describe solid state board)

The sensor system 50 may provide one or more location sensors for providing electronic control signal that corresponds to piston location to a microprocessor controller. A plurality of hall effect sensors may be provided on a Line Control Board (LCB) that detect the piston location inside the cylinder. The control signal may further be provided as to include wireless communication capability, further integrated with or on the LCB, to communicate between a remotely positioned metering system 10 and a centrally located control system. Further communication may be provided with a standard PC or smartphone using the wireless protocol (such as Bluetooth, Wi-Fi, Internet, etc.). Bulk beverages from a number of sources may be metered upon demand as urged through the metering chamber 32 of an identified volume by a single system pressure generated from fluid communication with the bulk beverage container. In addition to eliminating the need to provide an accurate (rather than estimated) dispensed volume of various beverages, the present invention may also provide for the discharge to be dispensed at a temperature correlated as appropriate for the differing dispensed beverages (as described in greater detail below). With such operational characteristics, the present system 10 may provide a unique quality and quantity control can be easily accomplished, tracked, and reported.

As described in greater detail below, an anticipator piston detection method may be implemented on the Line Controller Board 50 based on a hardware setup that places multiple identical magnetic (Hall Effects) sensors at equal intervals and same plane, alongside the cylinder 32 with a moving piston containing a magnet 40. In such a configuration, at equal time intervals readings on all sensors are fed into a function that estimates the magnet's (and therefore piston's) location, relatively to the center of the cylinder.

Figure 4:
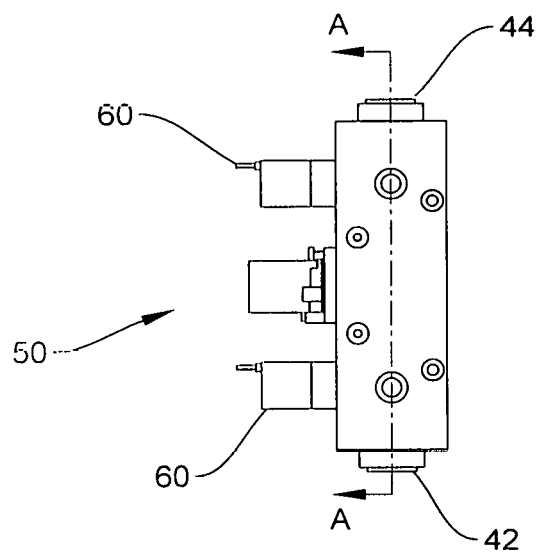
FIG. 4 is a right side elevational view thereof.
Figure 5:
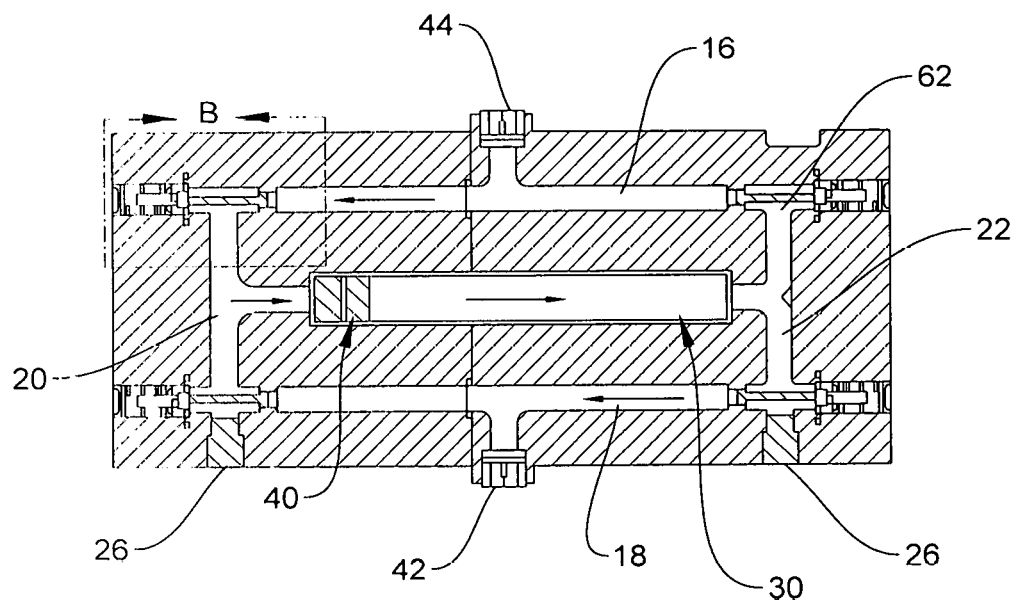
FIG. 5 is a cross sectional view taken along line A-A of FIG. 4.

Referring now further in greater detail in conjunction with FIG. 4-5, the chamber 40 is provided in the form of a container having a selected, defined internal volume 42. The chamber 40 is shown embodied as a cylindrical container; however, it should be noted that such a shape and configuration is not intended to be limiting to the present invention. As will be described in greater detail below, according to an aspect of the present invention the defined volume 42 may be equal to the volume of a desired beverage pour. Further, according to another aspect of the present invention the defined volume 42 may be equal to a fractional component of the volume of a desired beverage pour, thereby facilitating its use with mixed or blended drinks. Further still, according to yet another aspect of the present invention the defined volume 42 may be equal to a multiple of the volume of a desired beverage pour, thereby allowing for multiple dispenses from each reciprocating cycle.

The valve and actuator system provide a number of pneumatic actuators 60 that open and close the beer flow path. The actuators 60 urge the actuator piston 62 and opens the beer flow path. The actuator piston 62 threads or otherwise mates to a poppet spool 70 that forms a valve plug 72, with the corresponding valve seat 74 formed at the end terminus of each upper and lower fluid conduits 16, 18.

As described above, the metering mechanism 10 of the described teachings provides for a fluid communication input from the beverage supply, and a fluid communication discharge to a spigot or tap. The provided manifold design is compact and efficient, eliminating various three-way switching valves and flow splitters.

2. Operation of the Preferred Embodiment

The actuators 60, in de-energized state, keep the beer flow path closed. When the pour cycle is started, two diagonally opposite pneumatic valves are opened to let air into the actuators. The air retracts the actuator piston 62 and opens the beer flow path. The beer enters flows through the valve into the cylinder 32 and pushes the piston 40. The beer on the other side of the piston 40 is then pushed out of the cylinder 32 through the valve that is diagonally opposite. Once the piston reaches the end of the stroke, the cycle is repeated with the flow reversed using the other two valves.

Using the sensor hardware configuration where multiple identical magnetic (Hall Effects) sensors are positioned at equal intervals and in the same plane collinear with the movement of the magnetic piston, for a given set of momentary readings the sensors to the left and right of the piston will show also show anticipatory readings that are higher in absolute values than those on sensors farther away from the piston. The two readings of the two opposing sensors will also be opposite in sign, relative to an appropriately chosen zero value. (Zero value represents reading on a sensor absent of a magnet). In this particular setup, depending on the exact location of the piston, these two sensors can be adjacent, or have another sensor in between. In the earlier case, the reading on the sensor in the middle will be lower in absolute value than either of the other two, and if the magnet is perfectly aligned with the middle sensor, its reading will be close to the zero value.

Figure 11:
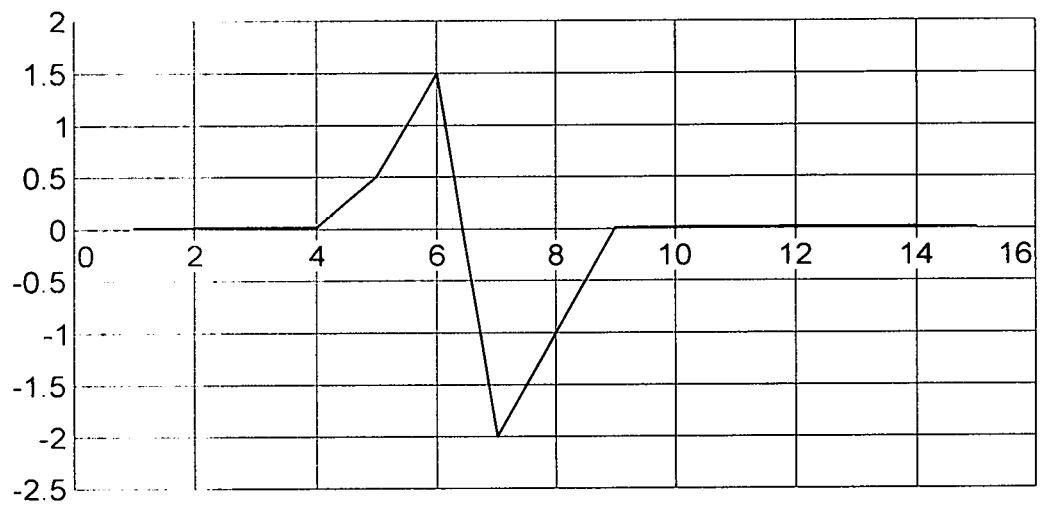
FIG. 11 is a graph showing a typical distribution of signals on an array of sensors for use therewith.

A typical distribution of signals on an array of sensors is shown in the graph of FIG. 11. Here, X axis are the sensors numbered from 1 to 15, values on the Y axis are readings on corresponding sensors. The piston is located between sensors 6 (reading +1.5) and 7 (reading −2). Its exact location corresponds to a 0 "reading" between sensors 6 and 7 and can be estimated using any method of interpolation.

Figure 12:
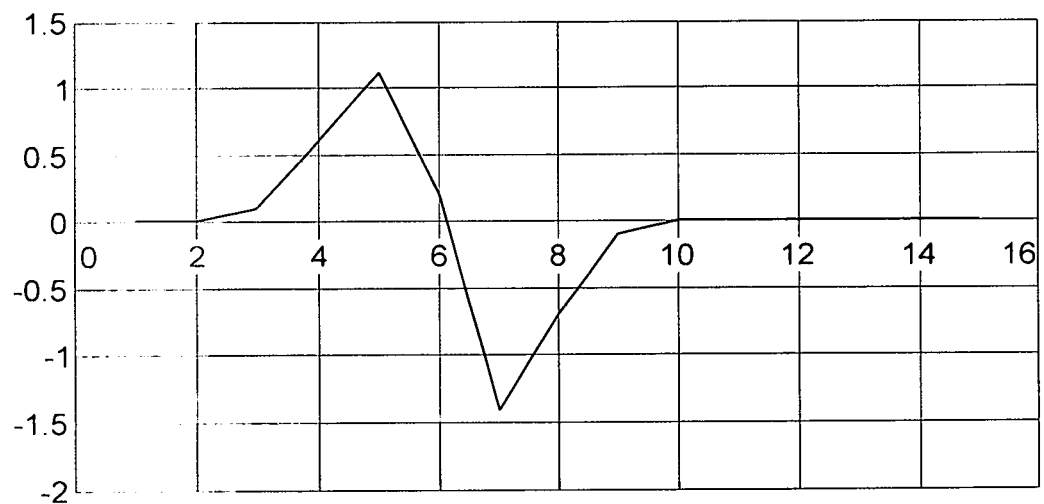
FIG. 12 is a graph showing a minimum/maximum distribution of signals on an array of sensors for use therewith.

Referring in conjunction to the graph of FIG. 12, a case is illustrated when the sensors with minimum/maximum readings are located 2 sensors apart. Here, even though the sensors with the maximum and minimum values are 5 and 7 respectively, the piston is located somewhere between sensors 6 and 7, since they are adjacent and show readings of opposing signs. The interpolation in this case will use readings on sensors 6 and 7 as its starting points.

By calculating the location of the magnet based on the set of readings reported by the sensors at a given moment of the, the calculated location of the piston may be utilized in the control even when the actual sensor location is questionable. The logic of such a calculation function consists of 2 steps:

a. Step 1 determines the two sensors that show the maximum and minimum readings over the entire set. The hardware setup, as stated earlier, guarantees that they will be 1 or 2 sensors apart.

If sensors with minimum/maximum readings are adjacent (as 6 and 7 on FIG. 1), their readings are used in Step 2.

b. If sensors with minimum/maximum readings are two sensors apart, the function chooses the two sensors out of the three that show readings with opposite signs (as 6 and 7 on FIG. 12) and uses them as inputs to the Step 2.

Step 2 performs linear interpolation based on two readings of opposite sign to find the point when the curve crosses 0 between two points. If the "0-point" is close to one of the two sensors, it additionally applies a smoothing function which has been constructed based on actual data observed for the given hardware setup.

The result of the interpolation is reported as the estimated location of the middle of the piston.

The foregoing descriptions of specific embodiments of the present invention are presented for purposes of illustration and description. They are not intended to be exhaustive nor to limit the invention to precise forms disclosed and, obviously, many modifications and variations are possible in light of the above teaching. The embodiments are chosen and described in order to best explain principles of the invention and its practical application, to thereby enable others skilled in the art to best utilize the invention and its various embodiments with various modifications as are suited to the particular use contemplated. It is intended that a scope of the invention be defined broadly by the Drawings and Specification appended hereto and to their equivalents. Therefore, the scope of the invention is in no way to be limited only by any adverse inference under the rulings of Warner-Jenkinson Company, v. Hilton Davis Chemical, 520 US 17 (1997) or Festo Corp. v. Shoketsu Kinzoku Kogyo Kabushiki Co., 535 U.S. 722 (2002), or other similar case-law or subsequent precedent should not be made if any future claims are added or amended subsequent to this or any prior parent patent application.

What is claimed is:

1. In a dispensing and pour control system for a regulated beverage having a metering system that provides for said beverage to be discharged in a controlled and metered manner, wherein the improvement comprises:

a sensor system comprise a plurality of magnetic sensors provided on a Line Control Board (LCB) that detect the piston location inside a metering conduit; and said plurality of magnetic sensors are each identical magnetic sensors positioned at equal intervals and in the same plane collinear with the movement of a magnetic piston within a metering mechanism conduit.

2. A method for piston detection in the dispensing and pour control system of claim 1 comprising:

obtaining a set of momentary readings of magnetic sensors to the left and right of the piston, said momentary readings being higher in absolute values than those on magnetic sensors farther away from the piston and wherein two readings of the two opposing sensors are also opposite in sign, relative to a chosen zero value represents reading on a sensor absent of a magnet; and estimating an anticipated location of the piston by interpolation of a the piston location based on absolute value of readings of adjacent magnetic sensors.

3. The method for piston detection of claim 2, wherein said interpolation is performed with sensor readings between a minimum reading and a maximum reading of adjacent sensors to anticipate a location between sensors that are adjacent and showing readings of opposing signs.

4. The method of claim 2, wherein the anticipated piston location is interpreted by calculating the location of the magnet based on the set of readings reported by the sensors.

5. The method of claim 4, wherein the interpolation is obtained from a set of momentary readings of the magnetic sensors and estimating the exact location of the piston by a the distance between the sensors that are adjacent.

6. The method of claim 4, wherein said calculation comprises a calculation function consists of the steps:
   a. determining the two sensors that show the maximum and minimum readings over the entire set; and
   b. performing a linear interpolation based on two readings of opposite sign to find the point where the curve crosses 0 between two points.

7. The method of claim 3, wherein the anticipated piston location is interpreted by calculating the location of the magnet based on the set of readings reported by the sensors.

8. The method of claim 7, wherein the interpolation is obtained from a set of momentary readings of the magnetic sensors and estimating the exact location of the piston by a the distance between the sensors that are adjacent.

9. The method of claim 7, wherein said calculation comprises a calculation function consists of the steps:
   a. determining the two sensors that show the maximum and minimum readings over the entire set; and
   b. performing a linear interpolation based on two readings of opposite sign to find the point where the curve crosses 0 between two points.

10. The method of claim 2, wherein if the "0-point" is close to one of the two sensors a smoothing function is applied that is constructed based on actual data observed for a given hardware setup.

11. A dispensing and pour control system for a regulated beverage comprising:
   a bulk storage and distribution system for a pressurized beverage;
   a metering mechanism in fluid communication with a beverage supply in operative connection with said bulk storage and distribution system, said metering system for providing a specific selected volumetric discharge in fluid communication with a tap or spigot in a manner that provides for said beverage to be discharged in a controlled and metered manner into a drinking container that is coordinated the beverage being discharged;
   said metering mechanism further comprising:
      a first manifold block and a second manifold block formed as a generally rectangular cuboid element having a mating interface where said first manifold block and said second manifold block are affixed collinearly along a lateral centerline such as to form a minimized volume manifold block;
      a metering conduit formed within said manifold block;
      a piston having a magnetic target reciprocating within said metering conduit;
      a sensor control system comprising a plurality of magnetic sensors provided on a Line Control Board (LCB) that detect a location of the piston inside the metering conduit;
      said plurality of magnetic sensors are each identical magnetic sensors positioned at equal intervals and in the same plane collinear with the movement of a magnetic piston within a metering mechanism conduit; and
      a valve and actuator system;
   wherein said metering mechanism operatively utilizes pressure from said bulk storage as a motive force while maintaining a system pressure within said storage and distribution system between dispensing cycles.

12. The dispensing and pour control system for a regulated beverage of claim 11, wherein the piston is detected:
   obtaining a set of momentary readings of the magnetic sensors to the left and right of the piston, said momentary readings being higher in absolute values than those on magnetic sensors farther away from the piston and wherein two readings of the two opposing sensors are also opposite in sign, relative to a chosen zero value represents reading on a sensor absent of a magnet; and
   estimating an anticipated location of the piston by interpolation of the piston location based on absolute value of readings of adjacent magnetic sensors.

13. The dispensing and pour control system for a regulated beverage of claim 12, wherein said interpolation is performed with sensor readings between a minimum reading and a maximum reading of adjacent sensors to anticipate a location between sensors that are adjacent and showing readings of opposing signs.

14. The dispensing and pour control system for a regulated beverage of claim 12, wherein the anticipated piston location is interpreted by calculating the location of the magnet based on the set of readings reported by the sensors.

15. The dispensing and pour control system for a regulated beverage of claim 14, wherein the interpolation is obtained from a set of momentary readings of the magnetic sensors and estimating the exact location of the piston by a distance between the sensors that are adjacent.

16. The dispensing and pour control system for a regulated beverage of claim 14, wherein said calculation comprises a calculation function consists of the steps:
   a. determining the two sensors that show the maximum and minimum readings over the entire set; and
   b. performing a linear interpolation based on two readings of opposite sign to find the point where the curve crosses 0 between two points.

17. The dispensing and pour control system for a regulated beverage of claim 13, wherein the anticipated piston location is interpreted by calculating the location of the magnet based on the set of readings reported by the sensors.

18. The dispensing and pour control system for a regulated beverage of claim 17, wherein the interpolation is obtained from a set of momentary readings of the magnetic sensors and estimating the exact location of the piston by a the distance between the sensors that are adjacent.

19. The dispensing and pour control system for a regulated beverage of claim 17, wherein said calculation comprises a calculation function consists of the steps:
   a. determining the two sensors that show the maximum and minimum readings over the entire set; and
   b. performing a linear interpolation based on two readings of opposite sign to find the point where the curve crosses 0 between two points.

* * * * *